(12) United States Patent
Lentz et al.

(10) Patent No.: US 11,419,309 B2
(45) Date of Patent: Aug. 23, 2022

(54) ANIMAL FEEDER AND METHOD OF USE (71) Applicant: Aquapaw, LLC, Campbell, CA (US)

(72) Inventors: Daniel Lentz, Campbell, CA (US); Tom Zipprian, San Francisco, CA (US)

(73) Assignee: Aquapaw Brands LLC, Seattle, WA (US)

(*) Notice: Subject to any disclaimer, the term of this patent is extended or adjusted under 35 U.S.C. 154(b) by 0 days.

(21) Appl. No.: 17/098,622

(22) Filed: Nov. 16, 2020

(65) Prior Publication Data
US 2021/0059212 A1 Mar. 4, 2021

Related U.S. Application Data (63) Continuation-in-part of application No. 16/105,389, filed on Aug. 20, 2018, now Pat. No. 10,834,894.

(60) Provisional application No. 62/615,162, filed on Jan. 9, 2018.

(51) Int. Cl.
A01K 61/00 (2017.01)
A01K 5/01 (2006.01)
F16B 47/00 (2006.01)
A01K 15/02 (2006.01)

(52) U.S. Cl.
CPC ........... *A01K 5/0135* (2013.01); *A01K 15/02* (2013.01); *F16B 47/00* (2013.01)

(58) Field of Classification Search
CPC .... A01K 5/0135; A01K 15/02; A01K 5/0121; F16B 47/00

USPC .................. 119/51.01, 51.03, 61.57
See application file for complete search history.

(56) References Cited

U.S. PATENT DOCUMENTS

| 5,000,123 | A | * | 3/1991 | Morse | A01K 5/0114 |
| | | | | | 119/61.54 |
| 8,231,089 | B2 | * | 7/2012 | Mills | A47J 47/16 |
| | | | | | 248/206.3 |
| 8,919,288 | B2 | * | 12/2014 | Ressemann | A61D 5/00 |
| | | | | | 119/61.5 |
| 2008/0289581 | A1 | | 11/2008 | Cox, Jr. et al. | |
| 2010/0275852 | A1 | | 11/2010 | Lipscomb et al. | |
| 2015/0068461 | A1 | | 3/2015 | Lindskov et al. | |

* cited by examiner

*Primary Examiner* — Richard T Price, Jr.
(74) *Attorney, Agent, or Firm* — Ference & Associates LLC (57) ABSTRACT An animal feeder and method of use is described herein. The animal feeder is configured to distract, calm, or occupy an animal for an extended period of time. The animal feeder includes an elastomeric body having an obverse side and a reverse side. The obverse side includes a feeding section having a plurality of nubs. The plurality of nubs are configured to slow an animal's ability to lick food therefrom. On the reverse side is one or more suction cups to suction the animal feeder to a surface to secure the feeder system in a single location. The animal feeder further includes a guard extending laterally from the feeding section to keep the surface below the guard free from saliva, drool, or slobber from the animal.

17 Claims, 9 Drawing Sheets

ANIMAL FEEDER AND METHOD OF USE

CROSS-REFERENCE TO RELATED APPLICATIONS

This application is a continuation-in-part of U.S. Nonprovisional application Ser. No. 16/105,389 filed Aug. 20, 2018; that in turn claims priority benefit to U.S. Provisional Application Ser. No. 62/615,162 filed Jan. 9, 2018; the contents of which are incorporated by reference.

FEDERALLY SPONSORED RESEARCH OR DEVELOPMENT

Not Applicable

INCORPORATION BY REFERENCE OF MATERIAL SUBMITTED ON A COMPACT DISK

Not Applicable

SPECIFICATION

To all Whom it May Concern

Be it known that, Daniel Lentz and Tom Zipprian, have invented new and useful improvements in an animal feeder and method of use as described in this specification.

BACKGROUND OF THE INVENTION

Any pet owner, animal trainer, or caregiver knows the challenging task of keeping to an animal stationary, calm, and distracted while trying to perform one or more tasks on the animal. For example, many animals become anxious and unsettled while being bathed, having their hair or nails trimmed, or during a medical examination. The owner, trainer, or caregiver is left wrestling with the animal and a restraint may be used to corral the animal.

In other situations, an owner, trainer, or caregiver may choose to entertain, reward, or calm an animal for an extended period of time. Several animal treats are typically devoured in a few seconds with the animal begging for more almost instantaneously. Other treats may be made of a dense material (e.g., rawhide) to occupy the animal for an extended period of time, but these materials may not be suitable for an animal's diet or oral health.

In addition, many traditional feeder systems are comprised of a simple receptacle that receives the food or treats therein. The animal typically devours all the food within a matter of minutes while moving the receptacle from one end of the room to another, which is sub-optimal for distracting the animal while performing a task on the animal. Further, for veterinarians, trainers, caregivers, or other persons that handle several different pets in a day, it is good sanitary practice to clean those receptacles between uses. Having to constantly clean the receptacle is time consuming and if the receptacle is improperly cleaned, the animal may become ill. Furthermore, the surface or area around the receptacle may become drenched with saliva, drool, or slobber while the animal feeds, which may require a good cleaning after each feeding.

Thus there exists a need for an animal feeder to distract, entertain, calm, or occupy an animal for an extended period of time. There is a further need for an animal feeder to aid in training or rewarding an animal. There is an even further need for an animal feeder that is user-friendly, promotes good sanitary practices, and keeps the surrounding areas free from saliva, drool, or slobber.

FIELD OF THE INVENTION

The present invention generally relates to animal feeders, and more particularly, to an animal feeder to distract, entertain, calm, or occupy an animal for an extended period of time.

SUMMARY OF THE INVENTION

The general purpose of the animal feeder, described subsequently in greater detail, is to provide an animal feeder which has many novel features that result in an animal feeder which is not anticipated, rendered obvious, suggested, or even implied by prior art, either alone or in combination thereof.

An animal feeder is described herein. The animal feeder includes an elastomeric body having an obverse side and a reverse side. On the obverse side is a feeding section. The feeding section includes a plurality of nubs. The plurality of nubs hold food in the feeding section and slow an animal's ability to lick food therefrom. On the reverse side is one or more suction cups to suction the animal feeder to a surface. The animal feeder further includes a guard extending laterally from the feeding section to keep the surface below the guard free from saliva, drool, or slobber from the animal.

A method to entertain, distract, calm, or occupy an animal to keep the animal in one location for an extended period of time is also described here. The method includes the suctioning of the animal feeder to a surface. Food may be placed in the feeding section such as a creamy treat smeared between the plurality of nubs. An animal is permitted to lick the food in the feeding section. In specific applications, a user may bathe and/or examine the animal while the animal is distracted and calmed by the animal feeder.

Thus has been broadly outlined the more important features of the present animal feeder so that the detailed description thereof that follows may be better understood and in order that the present contribution to the art may be better appreciated.

Objects of the present animal feeder, along with various novel features that characterize the invention are particularly pointed out in the claims forming a part of this disclosure. For better understanding of the animal feeder, its operating advantages and specific objects attained by its uses refer to the accompanying drawings and description.

BRIEF DESCRIPTION OF THE DRAWINGS

In the figures, identical structures, element or parts that appear in more than one figure are generally labeled with a same numeral in all the figures in which they appear. Dimensions of components and features shown in the figure are generally chosen for convenience and clarity of presentation and are not necessarily shown to scale. The figures are listed below.

FIGURES

FIGS. 1A to 1D depict an embodiment of an animal feeder, where FIG. 1A is a perspective view thereof, FIG. 1B is a top view thereof, FIG. 1C is a side view thereof, and FIG. 1D is a bottom view thereof.

FIGS. 2A to 2D depict an embodiment of an animal feeder having a neck, where FIG. 2A is a perspective view thereof, FIG. 2B is a top view thereof, FIG. 2C is a side view thereof, and FIG. 2D is a cross-sectional view along the line marked in FIG. 2C.

FIGS. 3A to 3C depict an embodiment of an animal feeder having an elongated body, where FIG. 3A is a perspective view thereof, FIG. 3B is a side view thereof, and FIG. 3C is a cross-sectional view along the line marked in FIG. 3B.

FIGS. 4A to 4C depict an embodiment of an animal feeder without a body, where FIG. 4A is a perspective view thereof, FIG. 4B is a side view thereof, and FIG. 4C is a cross-sectional view along the line marked in FIG. 4B.

FIGS. 5A to 5C depict an embodiment of an animal feeder having a feeding receptacle and disposable food container, where FIG. 5A is a perspective view thereof, FIG. 5B is a top view thereof, and FIG. 5C is a side view thereof.

FIGS. 6A to 6C depict a disposable food container having a plurality of nubs therein, where FIG. 6A is a perspective view thereof, FIG. 6B is a top view thereof, and FIG. 6C is a cross-sectional side view thereof along the line A marked in FIG. 6B.

FIGS. 7A to 7D depict an animal feeder having a guard, where FIG. 7A is a top view thereof, FIG. 7B is bottom view thereof, FIG. 7C is a side view thereof, and FIG. 7D is a perspective view thereof.

DETAILED DESCRIPTION OF THE DRAWINGS

The present invention has utility as an animal feeder to distract, entertain, calm, or occupy an animal for an extended period of time. The animal feeder may be user-friendly and promote good sanitary practices. More specifically, the animal feeder may: a) entertain an animal for an extended period of time; b) distract the animal during an experience they would normally find uncomfortable like bathing, nail trimming, or a visit to the vet; c) calm the animal as licking is a natural act which calms animals down; and d) train an animal to positively reinforce a pets actions or location during a training session. The animal feeder described herein is particularly advantageous in keeping an animal in one location while performing one or more tasks on the animal. The following description of various embodiments of the invention is not intended to limit the invention to those specific embodiments, but rather to enable any person skilled in the art to make and use this invention through exemplary aspects thereof.

It is to be understood that in instances where a range of values are provided, that the range is intended to encompass not only the end point values of the range but also intermediate values of the range as explicitly being included within the range and varying by the last significant figure of that range. By way of example, a recited range of 1 to 4 is intended to include 1-2, 1-3, 2-4, 3-4, and 1-4.

As used herein, a "nub" is defined herein as a protuberance or projection configured to slow the rate at which an animal feeds from the feeding section 18. The nubs may assume any shape or size to slow the rate at which an animal feeds, unless otherwise limited by the claims.

With reference now to the drawings, and in particular FIGS. 1A through 5C thereof, example of the instant animal feeder employing the principles and concepts of the present animal feeder and generally designated by the reference number 10 will be described.

Referring particularly to FIGS. 1A through 1D, a specific embodiment of an animal feeder 10a is illustrated. The animal feeder 10a generally includes an elastomeric body 12 having an obverse side 14 and a reverse side 16. On the obverse side 14 is a feeding section 18. The feeding section 18 includes a plurality of nubs 20 with a rim 22 disposed therearound. The plurality of nubs 20 help hold food (e.g., a creamy treat) disposed in the feeding section 18 and slow the animal's licking/feeding. On the reverse side 16 is a plurality of suctions cups (24a, 24b, 24c) to suction the animal feeder 10a to a surface to ensure the system 10a does not move as the animal licks food therefrom. The feeder system 10a is particularly configured to be suctioned to a vertical wall, such as the wall of a bathing area, exam room, training area, or an owner's home, to permit the animal to feed in an upright and comfortable position. The animal may then lick food from the feeding section, being slowed by the hindering nubs 20, while being washed, examined, rewarded, etc. Accordingly, the feeder system 10a provides an effective means to keep the animal within a desired workspace for an extended period of time. As used herein, an extended period of time in some embodiments refers to 10 seconds to 1 minute, while in other embodiments refers to 30 seconds to 30 minutes, and in a further embodiment refers to 30 minutes to 2 hours. It will be appreciated that the extended period of time may be lengthened or shortened based on: a) the amount of food disposed in the feeding section 18; b) the size of the feeding section 18; and/or c) the configuration of the plurality of nubs 20 as further described below.

In specific inventive embodiments, the elastomeric body 12 is flat to prevent the animal from dislodging the feeder system when suctioned to a surface. As used herein, the term "flat" refers to a body having a length and/or width greater than its thickness. In some embodiments, the length and/or width is 2 to 10 times the thickness, while in other embodiments, the length and/or width is 10 to 50 times the thickness, while in a further embodiment, the length and/or width is 50 to 1000 times the thickness. These dimensional range embodiments may be extended to the dimensions of the animal feeder 10a as a whole (e.g., the body 12, feeding section 18, and suction cups (24a, 24b, 24c) together have a length and/or width 2 to 10 times greater than their collective thickness). In some embodiment, the elastomeric body 12 is substantially triangular in shape, substantial in that the body 12 has three corners. A triangular shape is particularly advantageous for suctioning the feeder system 10a to a vertical surface.

In particular inventive embodiments, the plurality of suction cups (24a, 24b, 24c) is three suction cups (24a, 24b, 24c) arranged in a triangle to improve the stability of the animal feeder when suctioned to a vertical surface. Each suction cup (24a, 24b, 24c) may be positioned at or in proximity to the edges of the elastomeric body 12, such as the corners of a body 12 having a triangular shape.

The animal feeder 10 may further include a plurality of tabs (26a, 26b, 26c), where each tab (26a, 26b, 26c) is located on or proximal to a corresponding suction cup (24a, 24b, 24c). The tabs are pullable to permit a user to pull and release the corresponding suction cup (24a, 24b, 24c) from a surface. The tabs (26a, 26b, 26c) may be made of an elastomeric material similar to the elastomeric body 12, or may be made of other materials including textiles or other polymeric materials. In a specific embodiment, each tab (26a, 26b, 26c) is located on top and near an edge of their corresponding suction cups (24a, 24b, 24c) for easy release and access to the tab (26a, 26b, 26c).

In a specific inventive embodiment, the feeding section 18 is circular having a diameter defined by the inner diameter of the rim 22. However, it will be appreciated that the feeding section 18 may assume other shapes or forms including an ellipse, a square, a rectangle, a star, a polygon, or other open or closed shapes. The feeding section 18 includes the plurality of nubs 20. The plurality of nubs 20 may project from the surface of the obverse side 14 of the body 12. The nubs 20 may be in the shape of a cone having a rounded tip, although other shapes are possible. In some embodiments, the nubs 20 project or have a height of 0.25 inches to 0.5 inches, while in other embodiments the height is 0.5 inches to 1 inch, while in further embodiments the height is 1 inch to 3 inches. In a particular embodiment, the height of each nub is uniform, while in other embodiments, the height of each nub may vary to control the rate at which the animal feeds as further described below.

Figure 1A:
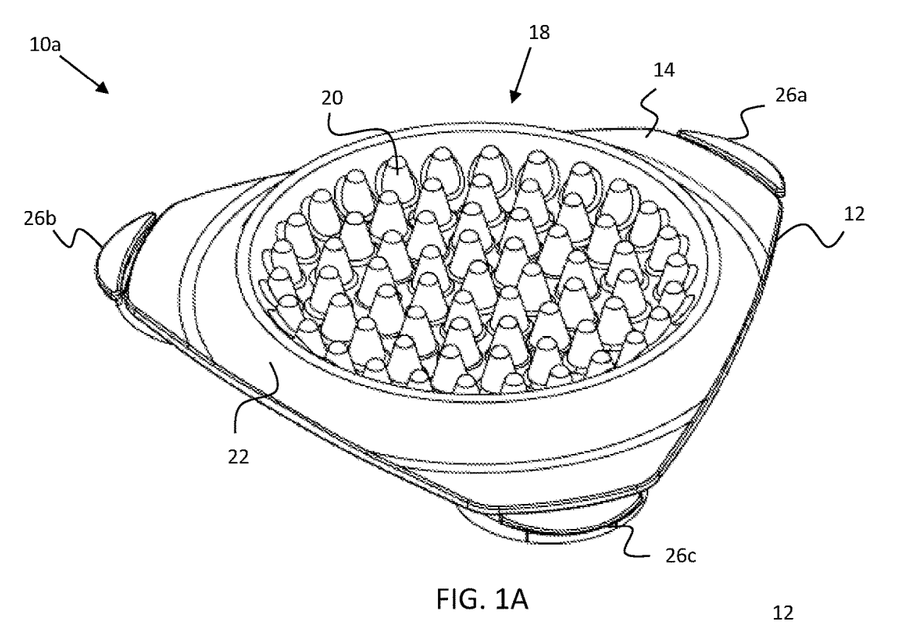
Figure 1B:
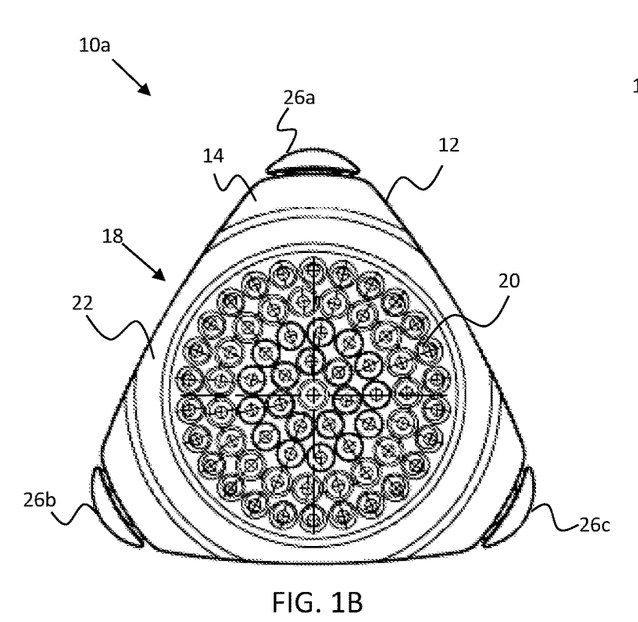
Figure 1C:
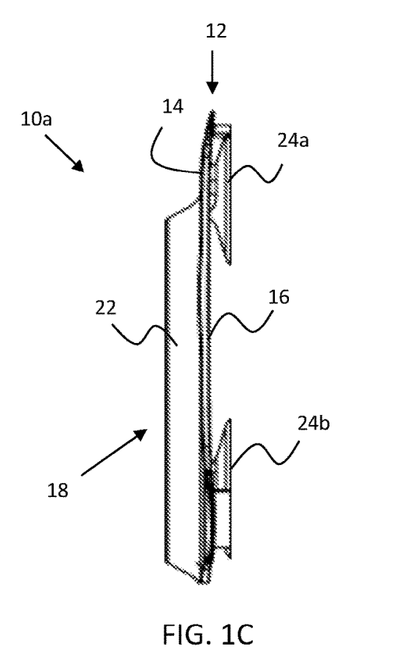
Figure 1D:
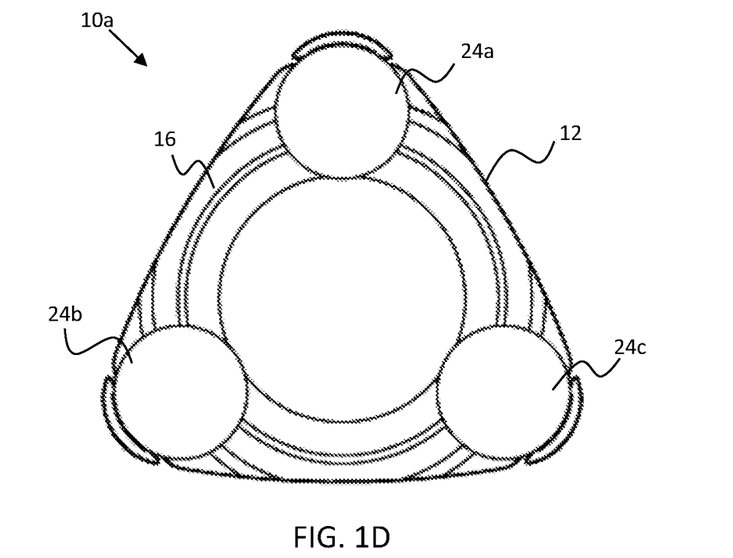
Figure 2A:
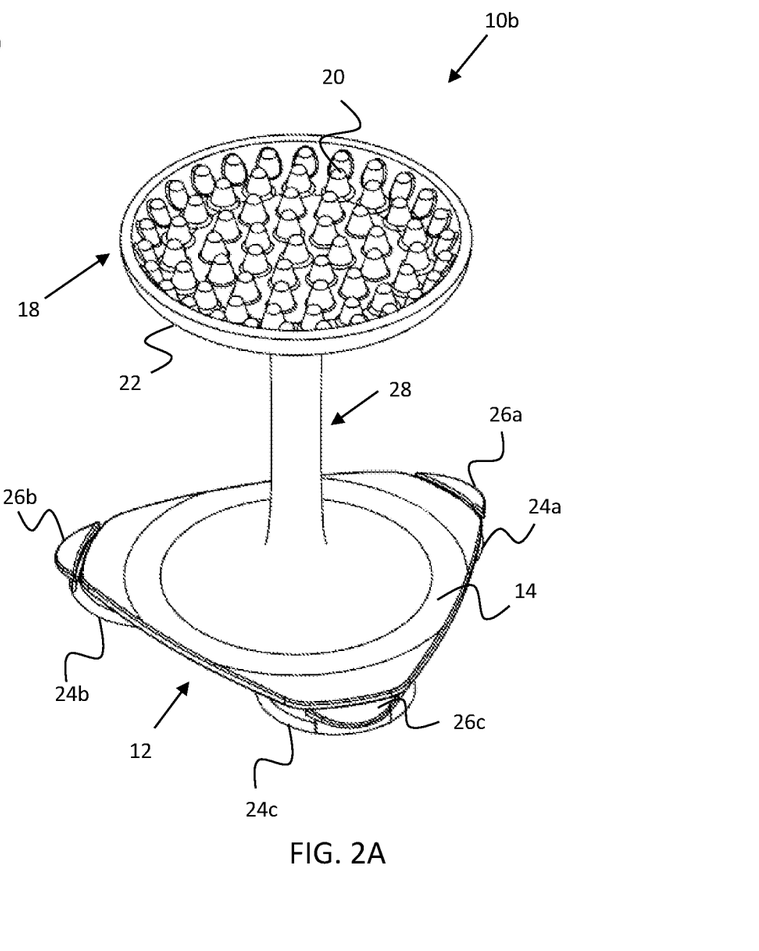
Figure 2B:
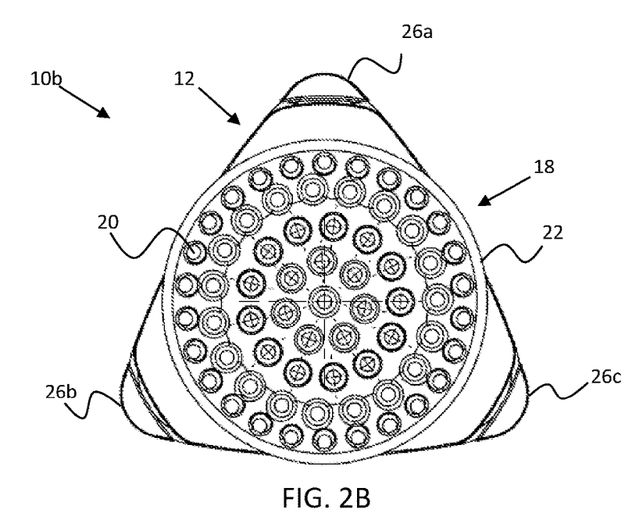
Figure 2C:
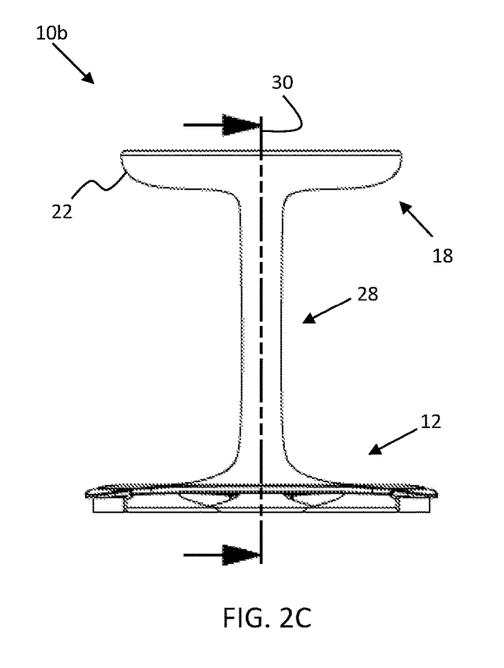
Figure 2D:
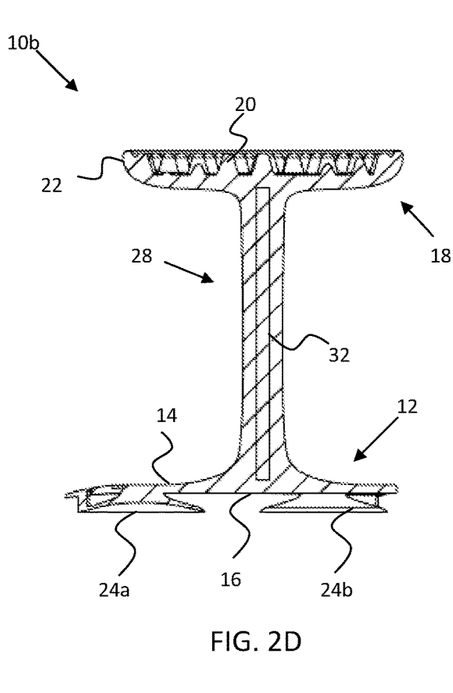

The plurality of nubs 20 are configured to slow the rate at which an animal feeds from the feeding section 18. The nubs 20 act as an impediment to slow the animals feeding rate because the animal has to lick between the nubs 20 to reach the food. The feeding rate may be controlled based on the arrangement of the plurality of nubs 20. For instance, in one embodiment, the plurality of nubs are arranged adjacent to one another wherein the density of the nubs are less at a first region of the feeding section compared to a second region of the feeding section to slow the animal's ability to lick the food in the second region compared to the first region. For example, there may be fewer nubs in a center region of the feeding section 18 (more space between each nub) compared to a greater number of nubs near an outer region of the feeding section 18 (less space between each nub). With this configuration, less effort is required to access the food in the center region providing a quicker reward. The animals feeding rate then decreases as the animal licks towards the outer region. In a further embodiment, the plurality of nubs 20 may be non-uniform in size to further control the feeding rate. For example, a higher density of smaller diameter nubs may be present in one region of the feeding section 18 compared to a region having a low density of smaller diameter nubs or a region having a higher density of larger diameter nubs. It is further contemplated to control the feeding rate by having the same density of nubs in a first region and a second region, but the size of the nubs in the first region are smaller than the size of the nubs in the second region, thereby having a slower feeding rate in the second region compared to the first region. The non-uniform size may be pertinent to both width and height of the nubs 20. In a specific inventive embodiment, the plurality of nubs 20 are arranged adjacent to one another in a circular pattern to form a circular row of nubs, wherein the feeding section 18 includes a plurality of circular rows of nubs, each row of increasing radii from a center of the feeding section with a single nub in the center of the feeding section as best seen in FIG. 1B. In a particular embodiment, the spacing between a first adjacent pair of circular rows may be greater than the spacing between a second adjacent pair of circular rows to slow the animal's ability to lick the food between the second adjacent pair compared to the first adjacent pair. The plurality of nubs 20 may likewise be non-uniform in size to control the feeding rate as described above.

The plurality of nubs 20 are fenced around by the rim 22. The rim 22 may demarcate the feeding section 18. In particular embodiments, the rim 22 projects from the surface of the obverse side 14 of the body 12 to surround the entirety of the plurality of nubs 20. The rim 22 may project or have a height equal to, greater, or less than the height of the plurality of nubs 10. The rim 22 may further include an interior and/or exterior taper starting from the peak of the rim 22 and tapering down to the obverse side 22 of the body 12. The taper may further contribute to the flatness of the animal feeder 10*a* to prevent an animal from dislodging the system 10*a* when suctioned to a surface.

In specific inventive embodiments, the elastomeric body 12, the feeding section 18, and the plurality of suction cups (24*a*, 24*b*, 24*c*) are a single molded piece of elastomeric material. The tabs (26*a*, 26*b*, 26*c*) may likewise be including in the single molded piece of elastomeric material. Preferably, the elastomeric material is silicone or a similar elastomeric material due to its elastic properties, availability, suctioning capability, and ease of washing (e.g., dishwasher safe). In other embodiments, the feeding section 18, suction cups (24*a*, 24*b*, 24*c*), and/or tabs (26*a*, 26*b*, 26*c*) are assembled to the elastomeric body 12, wherein each may be made of the same or a different elastomeric material.

With reference now to FIGS. 2A-2D, a particular inventive embodiment of an animal feeder 10*b* is illustrated. The animal feeder 10*b* includes an elastomeric body 12 having an obverse side 14 and a reverse side 16, a feeding section 18 having a plurality of nubs 20 with a rim 22 therearound, and a plurality of suction cups (24*a*, 24*b*, 24*c*) on the reverse side, all of which may incorporate their embodiments as described above. The animal feeder 10*b* further includes a neck 28 extending between the elastomeric body 12 and the feeding section 18 to extend the feeding section 18 from a surface on which the animal feeder 10*b* is suctioned. The neck 28 may be an elastomeric column in the form of a straight or lofted cylinder, cuboid, hyperboloid, or other shape extending between the body 12 and the feeding section 18. The length of the neck 28 may vary depending on the application and/or the distance requirements between a surface and the placement of the animal. In a particular embodiment, the neck 28 is made of an elastomeric material. The elastomeric body 12, the feeding section 18, the plurality of suction cups (24*a*, 24*b*, 24*c*), the plurality of tabs (26*a*, 26*b*, 26*c*), and the neck 28 may be formed from a single molded piece of elastomeric material. In one embodiment, the length of the neck 28 may be adjusted to control the feeding rate. For example, a longer elastomeric neck 28 is less stiff and will therefore wobble, waiver, and deflect as an animal is licking the feeding section 18 which further slows the animal's feeding rate. In another embodiment, with reference to FIG. 2D which is a cross-sectional view down the line 30 of FIG. 2C, the neck 28 may be reinforced with a structural support 32 positioned down the center of the neck 28. The structural support 32 may be a metal or polymeric wire, rod, bar, or other elongated support structure to improve the stiffness of the neck 28. The stiffness of the structural support 32 may be varied to control the feeding rate. For example, a structural support 32 with a low stiffness will result in a slower feeding rate, while a completely rigid structural support 32 simply supports the feeding section 18.

Figure 3A:
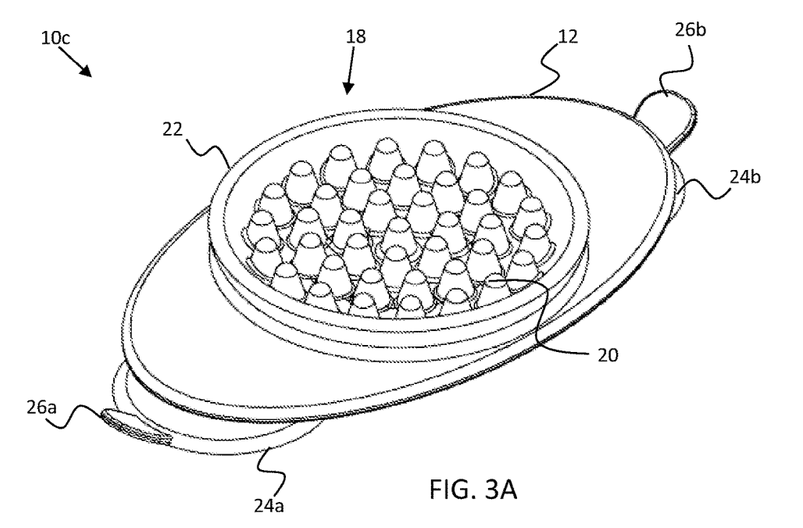
Figure 3B:
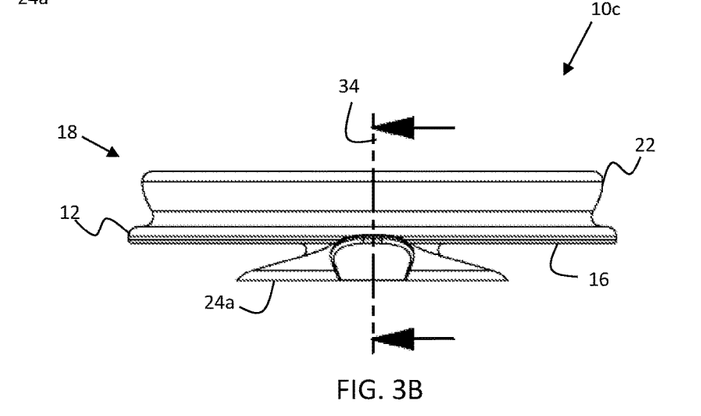
Figure 3C:
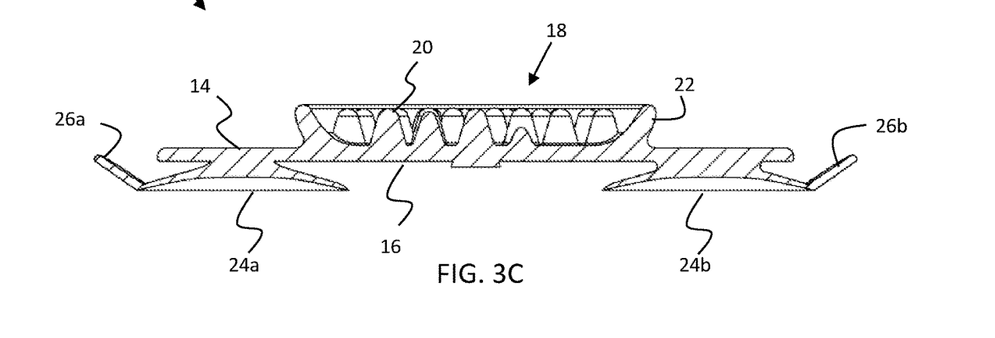

With reference now to FIGS. 3A-3C, a specific inventive embodiment of an animal feeder 10*c* is illustrated. The animal feeder 10*c* includes an elastomeric body 12 having an obverse side 14 and a reverse side 16, a feeding section 18 having a plurality of nubs 20 with a rim 22 therearound, and a plurality of suction cups (24*a*, 24*b*, 24*c*) on the reverse side, all of which may incorporate their embodiments as described above. The elastomeric body 12 of the animal feeder 10*c* may be flat and elongated in shape, wherein the plurality of suction cups (24*a*, 24*b*) is two suction cups (24*a*, 24*b*). The two suction cups (24*a*, 24*b*) may be located at opposing edges of the body 12 along a major axis thereof. The elongated shape and two suction cups may improve the stability of the animal feeder 10*c* when suctioned to a surface. FIG. 3C depicts a cross-sectional view of the feeder system 10*c* along the line 34 of FIG. 3B showing the plurality of nubs 20 in the feeding section 18. The rim 22 may project from the surface of the obverse side to fence the plurality of nubs 20 therein. The rim 22 may further be in the form of a hyperboloid. The feeder system 10c further includes two tabs (26a, 26b), each located on a side edge of a corresponding suction cup (24a, 24b). The tabs (26a, 26b) being pullable to release the corresponding suction cup (26a, 26b) from a surface.

Figures 4A, 4B:
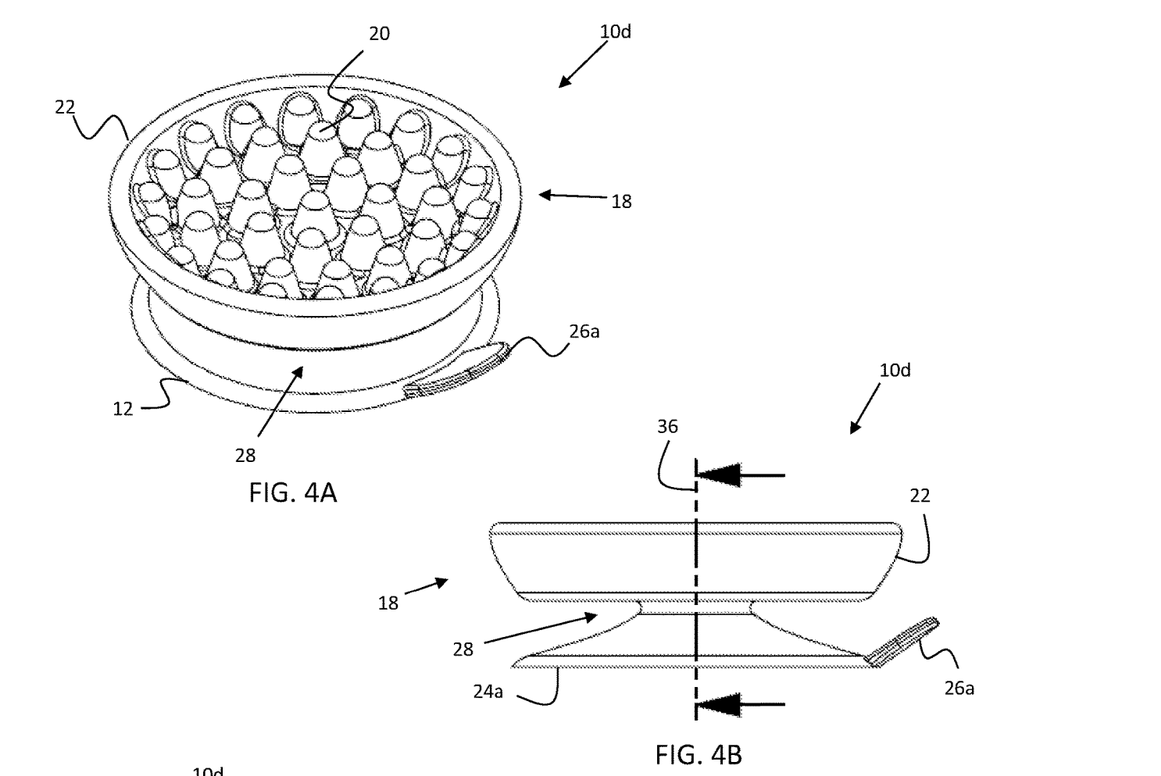
Figure 4C:
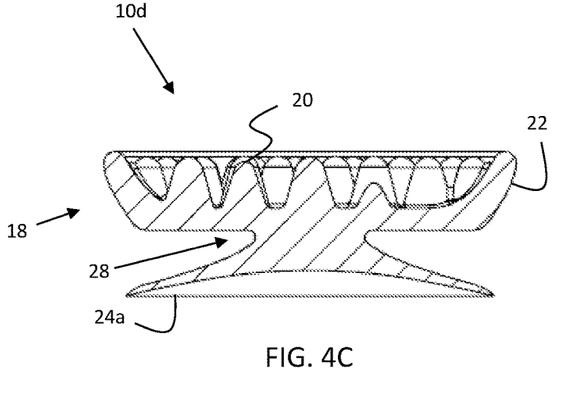

With reference to FIGS. 4A-4C, another embodiment of an animal feeder 10d is illustrated. The animal feeder 10c includes a feeding section 18 having a plurality of nubs 20 with a rim 22 therearound, and a suction cup 24a located on a bottom side of the feeding section 18. The feeding section 18 and suction cup 24 may incorporate their embodiments as described above. The animal feeder 10d may further include a neck 28 extending between the feeding section 18 and the suction cup 24a. The feeder system 10d likewise includes a tab 26a located at a side edge of the suction cup 24a to permit a user to release the suction cup 24a from a surface. FIG. 4C depicts a cross-sectional view along line 36 of FIG. 4B depicting the plurality of nubs 20 in the feeding section 18. The animal feeder 10d may be smaller in size compared to the aforementioned feeder systems (10a, 10b, 10c). In a particular embodiment, two or more animal feeders 10d are suctioned to the same surface to divert the animal's attention between the two or more animal feeders 10d to further control the animal's feeding rate. This diversion mechanism may be used with the other aforementioned animal feeders (10a, 10b, 10c).

Figures 5A, 5B, 5C:
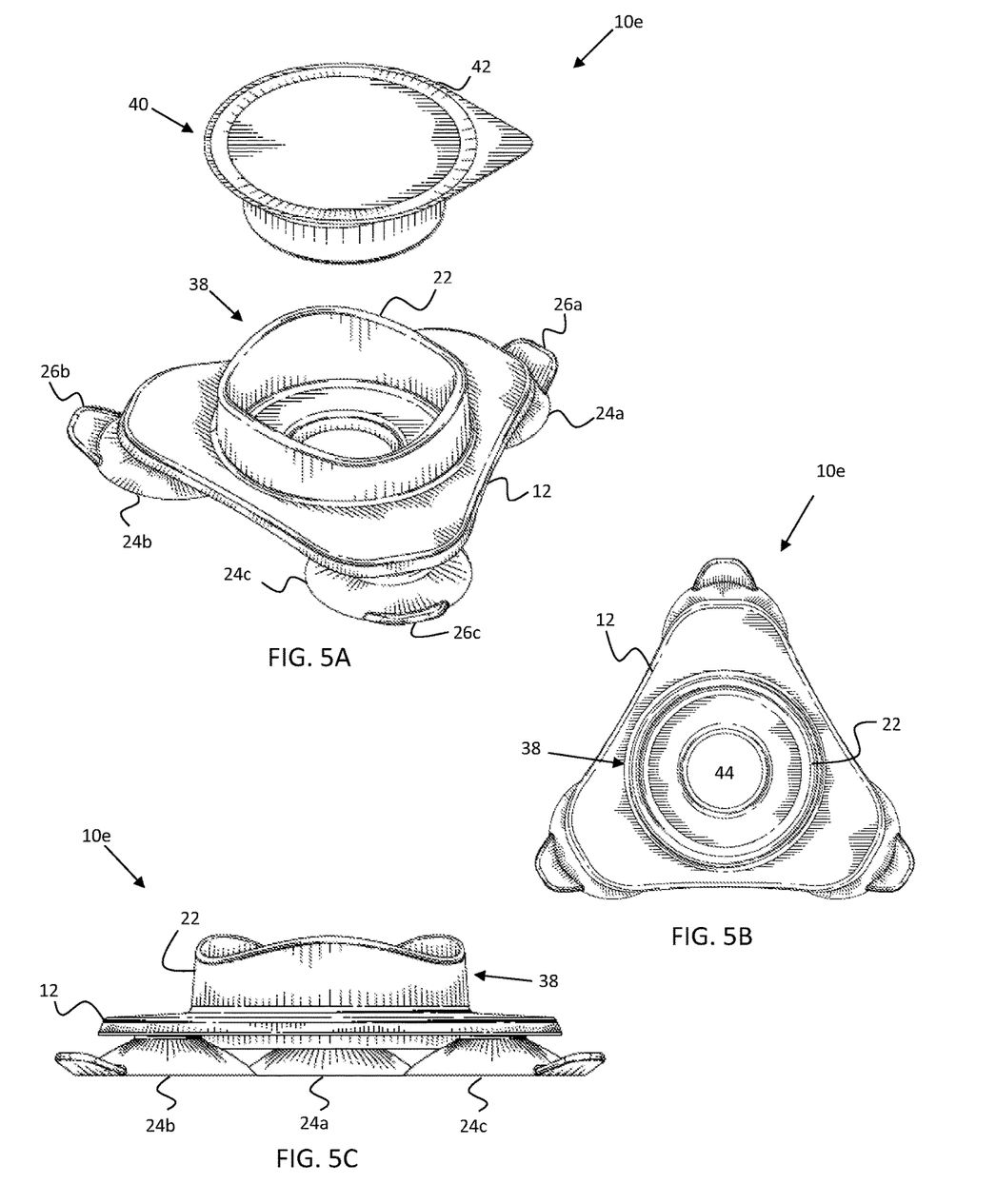

With reference to FIGS. 5A-5C, a specific inventive embodiment of an animal feeder system 10e is illustrated. The animal feeder system 10e includes an elastomeric body 12 having an obverse side and a reverse side. On the obverse side is a feeding receptacle 38 and on the reverse side are a plurality of suction cups (24a, 24b, 24c) to suction the animal feeder 10e to a surface. The animal feeder system 10e further includes a disposable food container 40 to be received in the feeding receptacle 38. The food container 40 has food therein and a removable lid 42. The container 40 is replaceable to negate the need to clean the feeding receptacle 28 between animal uses. A user may also quickly replace the container 40 when an animal finishes licking food therefrom to continually distract, calm, or occupy the animal.

The feeding receptacle 38 may include a rim 22 projecting from the surface of the obverse side of the body 12. The rim 22 may define the boundaries of the feeding receptacle 38. In some embodiments, the feeding receptacle 38 is circular in shape and receives a circular food container; however it will be appreciated that the feeding receptacle 38 may assume any shape or form and receive a food container 40 having a congruent shape. In particular inventive embodiments, the feeding receptacle 38 and the container 40 are sized to create a fiction fit to removably secure the container 40 in the feeding receptacle 38. In addition or alternatively, the feeding receptacle 38 and/or container 40 may be made of a material to create the friction fit (e.g., a silicone material). Other mechanisms may be used to secure the container 40 in the receptacle 28 including clamps, clasps, hook and loops, or other temporary fasteners.

The animal feeder system 10e may further include a plurality of tabs (26a, 26b, 26c). The elastomeric body 12, plurality of suction cups (24a, 24b, 24c), and the plurality of tabs (26a, 26b, 26c) may incorporate any of their embodiments as described above.

The elastomeric body 12, plurality of suction cups (24a, 24b, 24c), and the plurality of tabs (26a, 26b, 26c) may be made of a single molded piece of elastomeric material such as silicone. The disposable food container 40 may be made of a polymeric material, and more preferably, a recyclable polymeric material.

In a specific inventive embodiment, the animal feeder system 10e further includes a hole 44 through the elastomeric body 12 and inside the feeding receptacle 38. The hole 44 permits a user to push against a bottom portion of the disposable food container 40 when disposed in the feeding receptacle 38 to easily remove the container 40 therefrom.

Figure 6A:
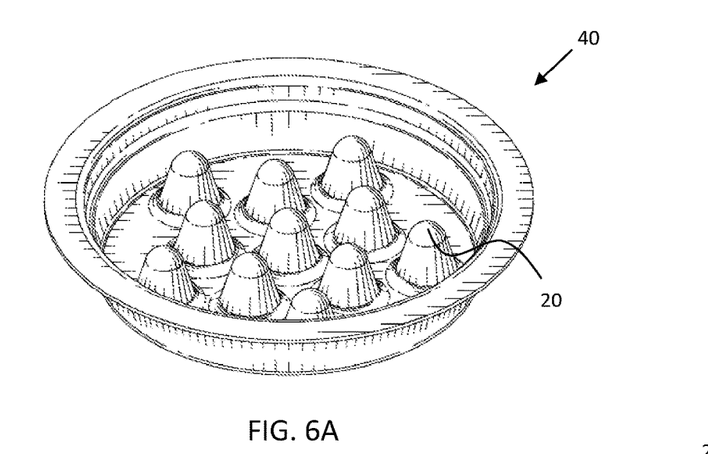
Figure 6B:
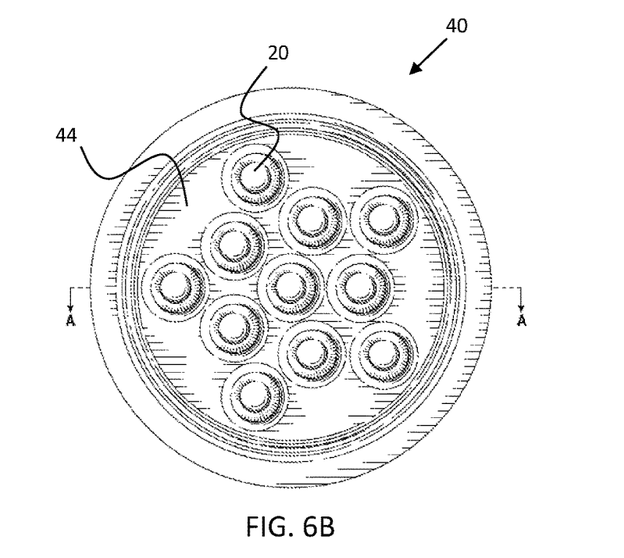
Figure 6C:
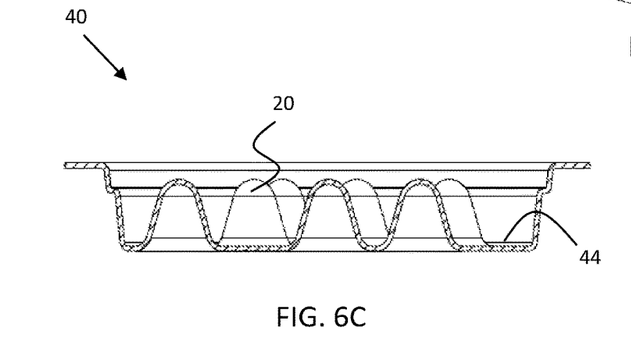
Figure 7A:
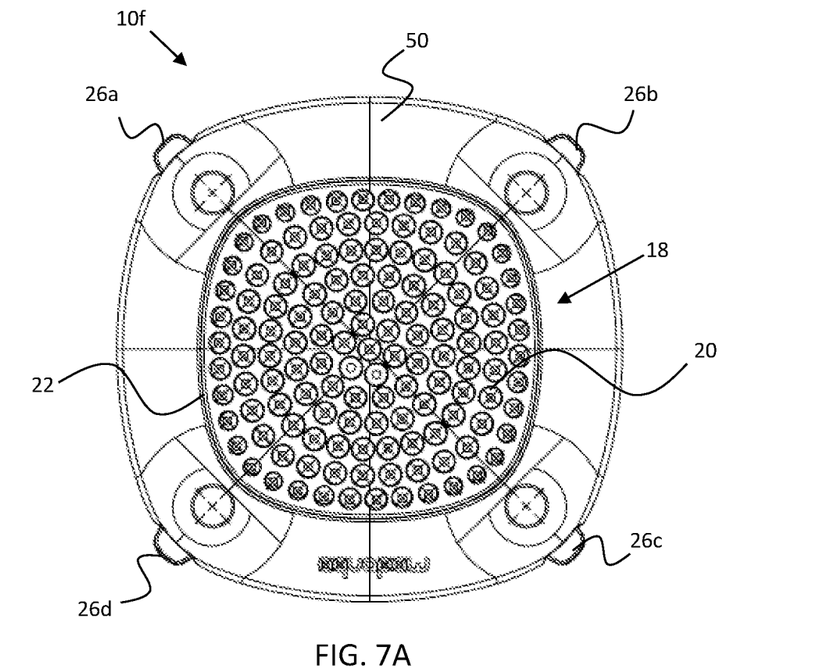
Figure 7B:
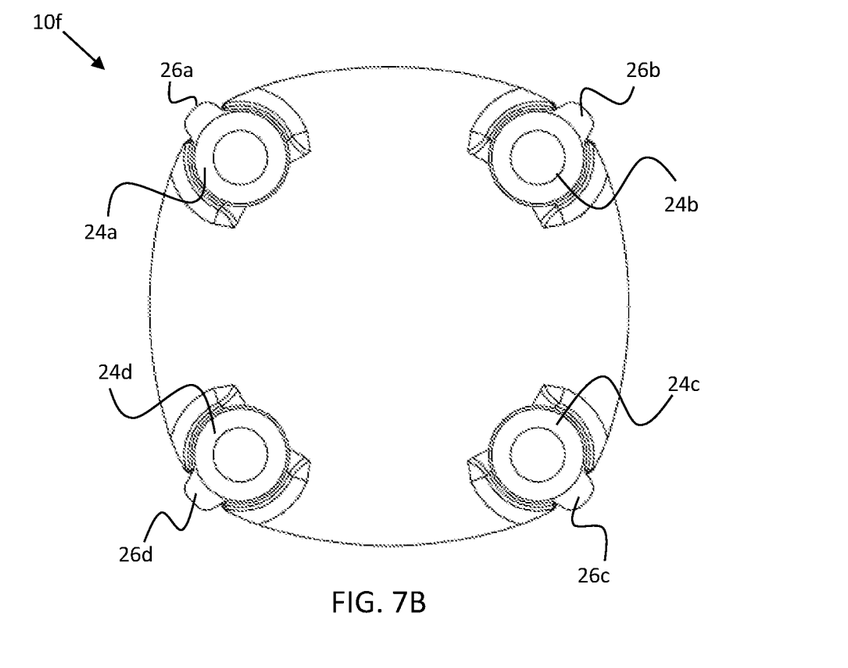
Figure 7D:
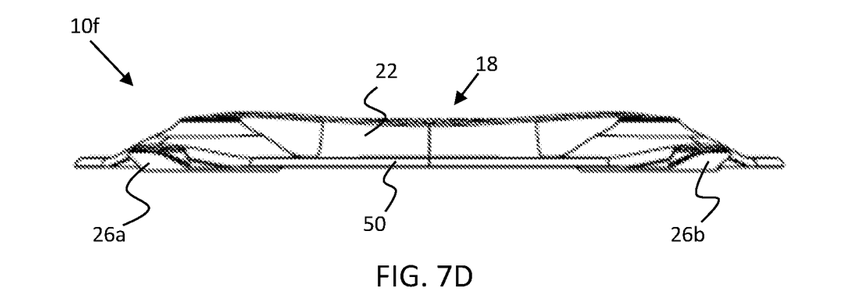

With reference to FIGS. 6A to 6C, the disposable food container 40 may further include a plurality of nubs 20 projecting from an interior bottom surface 44 of the disposable food container 40 to further slow an animal's ability to lick the food inside the container 40. The plurality of nubs 20 inside the container 40 may incorporate the embodiments of the nubs as described above.

With reference now to FIGS. 7A to 7D, a particular embodiment of an animal feeder 10f is shown. The animal feeder 10f generally includes an elastomeric body having an obverse side and a reverse side as previously described. On the obverse side is a feeding section 18. The feeding section 18 includes a plurality of nubs 20 to help hold food (e.g., a creamy treat) disposed in the feeding section 18 and slow the animal's licking/feeding. The feeding section 18 may further include a rim 22 disposed around the nubs 20, although the rim 22 may not be necessary if the food is creamy and/or can easily stick to the nubs 20. On the reverse side 16 is one or more suctions cups 24 to suction the animal feeder 10f to a surface to ensure the feeder 10f does not move as the animal licks food from the feeding section 18.

The animal feeder 10f further includes a guard 50. The guard 50 laterally extends beyond the feeding section 18 to keep the surface underneath the guard free from saliva, drool, or slobber from the animal. The guard may also assist a user in decoupling the animal feeder 10f from a surface without disturbing the food contained in the feeding section 18. The guard 50 may be part of the elastomeric body and laterally project in one or more directions away from the feeding section 18. In a particular embodiment, the animal feeder 10f includes a continuous guard 50 surrounding the perimeter of the feeding section 18, while in other embodiments, the guard 50 projects from only one or more sections of the feeding section 18. The guard 50 may alternatively be described as being part of the elastomeric body, where the feeding section 18 resides on the obverse side of the body, and the portions of the body laterally extending beyond the feeding section 18 make up the guard 50. The guard 50 may extend beyond the feeding section 18 anywhere from 0.15 to 0.6 times the length, width, or diameter of the feeding section 18.

One or more suction cups 24 may be disposed on a reverse side of the guard 50. In a specific embodiment, the animal feeder 10f includes four suction cups (24a, 24b, 24c, 24d) placed on four opposing sides, corners, or edges of the guard 50. Tabs 26 may be placed in proximity to each suction cup to assist the user in decoupling the suction cups from a surface, where each tab 26 may be disposed on the suction cup itself or on the guard in proximity to its corresponding suction cup. For example, an animal feeder 10f with four suction cups includes four corresponding tabs (26a, 26b, 26c, 26d).

The guard 50 may be planar (i.e., flat and thin), where a top surface of the guard 50 resides below the height of the nubs 20. In other words, the nubs 20 or rim 22 project above the top surface of the guard as best seen in FIG. 7C.

In a specific embodiment, a portion of the guard 50 may be raised, cupped, or undulate, to receive a suction cup therein such that the animal feeder 10f may be suctioned flush with a surface. For example, the animal feeder 10f may include a continuous guard 50 around the perimeter of the feeding section 18 with four suction cups (24a, 24b, 24c, 24d) disposed at four opposing corners of the guard 50. The guard 50 at the four opposing corners may undulate, be cupped, or otherwise raised to receive a suction cup therein. The remainder of the guard 50 between the suction cups is planar. In this configuration, the animal feeder 10f may be suctioned flush to a surface such that there is a minimal or no gap between the guard 50 and the surface to which that animal feeder 10f is suctioned.

A method of using any of the aforementioned animal feeders (10a-10f) includes suctioning the animal feeder (10a-10f) to a surface (e.g., a vertical surface such as a wall, or a horizontal surface such as the floor); either disposing/smearing food (e.g., a creamy treat) into the feeding section 18, or placing a food container 40 in the feeding receptacle 38; and permitting an animal to lick/feed from either the feeding section 18 or food container 40. The animal feeder (10a-10f) is particularly advantageous in keeping an animal in one location and to distract, calm, or occupy the animal for an extended period of time. An exemplary application includes the bathing of an animal wherein the animal feeder (10a-10f): a) keeps the animal in the workspace of the bathing area; and b) distracted and calm while bathing the animal.

Other Embodiments

While at least one exemplary embodiment has been presented in the foregoing detail description, it should be appreciated that a vast number of variations exist. It should also be appreciated that the exemplary embodiment or exemplary embodiments are only examples, and are not intended to limit the scope, applicability, or configuration of the described embodiments in any way. It should be understood that various changes may be made in the function and arrangement of elements without departing from the scope as set forth in the appended claims and the legal equivalents thereof.

What is claimed is:

1. An animal feeder comprising:
   an elastomeric body having an observe side and a reverse side;
   a feeding section on the observe side, said feeding section having a plurality of elastomeric nubs to help hold food disposed therein and slow an animal's ability to lick food therefrom;
   one or more suctions cups on the reverse side to suction the animal feeder to a surface; and
   a guard extending laterally from at least one section of the feeding section to keep the surface underneath the guard free from saliva, drool, or slobber from the animal, wherein the guard is integral to the elastomeric body and the guard is planar, and wherein the one or more suction cups are disposed on the reverse side of the guard.

2. The animal feeder of claim 1 wherein the guard is continuous about the perimeter of the feeding section.

3. The animal feeder of claim 2 further comprising one or more tabs in proximity to the one or more suction cups, wherein said tabs are pullable to release the suction cup from a surface.

4. The animal feeder of claim 3 wherein the one or more suction cups are four suction cups disposed on four opposing sides, edges, or corners of the guard.

5. The animal feeder of claim 4 wherein the one or more tabs is four tabs, wherein each tab is in proximity to a corresponding suction cup.

6. The animal feeder of claim 4 wherein the guard is planar.

7. The animal feeder of claim 6 wherein four portions of the planar guard is raised, undulates, or is cupped to receive a corresponding suction therein.

8. The animal feeder of claim 2 wherein the guard is planar.

9. The animal feeder of claim 8 wherein a portion of the planar guard is raised, undulates, or is cupped to receive a suction cup therein.

10. The animal feeder of claim 9 further comprising a rim disposed around the plurality of nubs.

11. The animal feeder of claim 9 wherein the elastomeric body, the feeding section, the plurality of nubs, and the guard are a single molded piece of elastomeric material.

12. The animal feeder of claim 1 wherein a portion of the planar guard is raised, undulates, or is cupped to receive a suction therein.

13. The animal feeder of claim 12 further comprising a rim disposed around the plurality of nubs.

14. The animal feeder of claim 12 wherein the elastomeric body, the feeding section, the plurality of nubs, and the guard are a single molded piece of elastomeric material.

15. The animal feeder of claim 1 further comprising a rim disposed around the plurality of nubs.

16. The animal feeder of claim 1 wherein the elastomeric body, the feeding section, the plurality of nubs, and the guard are single molded piece of elastomeric material.

17. A method to entertain, distract, calm, or occupy an animal to keep the animal in one location for an extended period of time, the method comprising:
   suctioning the animal feeder of claim 1 to a surface;
   placing food in the feeding section; and
   permitting an animal to lick the food to distract, calm, or occupy the animal to keep the animal in one location for an extended period of time.

* * * * *